United States Patent
Gatti et al.

(10) Patent No.: US 8,461,274 B2
(45) Date of Patent: Jun. 11, 2013

(54) POLYSILOXANE REDISTRIBUTION PROCESS

(75) Inventors: Christopher Darren Gatti, Hebron, KY (US); Seungbok Park, Florence, KY (US)

(73) Assignee: Dow Corning Corporation, Midland, MI (US)

( * ) Notice: Subject to any disclaimer, the term of this patent is extended or adjusted under 35 U.S.C. 154(b) by 213 days.

(21) Appl. No.: 13/060,017

(22) PCT Filed: Jul. 14, 2009

(86) PCT No.: PCT/US2009/050474
§ 371 (c)(1),
(2), (4) Date: Feb. 21, 2011

(87) PCT Pub. No.: WO2010/024973
PCT Pub. Date: Mar. 4, 2010

(65) Prior Publication Data
US 2011/0152421 A1    Jun. 23, 2011

Related U.S. Application Data

(60) Provisional application No. 61/092,081, filed on Aug. 27, 2008.

(51) Int. Cl.
*C08F 283/00* (2006.01)
*C09D 11/02* (2006.01)

(52) U.S. Cl.
USPC .......................................... 525/474; 524/251

(58) Field of Classification Search
USPC ........................................ 556/460; 525/474
See application file for complete search history.

(56) References Cited

U.S. PATENT DOCUMENTS

| | | | |
|---|---|---|---|
| 2,905,703 A | 9/1959 | Bailey et al. | |
| 3,983,148 A * | 9/1976 | Reedy et al. | .................. 556/460 |
| 4,079,070 A | 3/1978 | Maass et al. | |
| 4,382,145 A | 5/1983 | Yeboah | |
| 4,412,080 A | 10/1983 | Williams, Jr. | |
| 4,423,240 A | 12/1983 | Yeboah | |
| 4,556,726 A * | 12/1985 | Reedy et al. | .................. 556/460 |
| 4,764,631 A | 8/1988 | Halm et al. | |
| 4,772,737 A | 9/1988 | Lartigue-Peyrou et al. | |
| 7,612,222 B2 | 11/2009 | Wood | |

FOREIGN PATENT DOCUMENTS

| EP | 0552925 | 4/1997 |
|---|---|---|
| WO | 2006124106 | 11/2006 |

* cited by examiner

*Primary Examiner* — Randy Gulakowski
*Assistant Examiner* — Christopher M Rodd
(74) *Attorney, Agent, or Firm* — Catherine U. Brown

(57) ABSTRACT

The invention pertains to the redistribution of cyclic and linear polysiloxanes by a method comprising contacting and heating a surfactant, wherein the surfactant is the salt of a protonated amine or a quaternary amine compound, an aqueous hydrochloric acid solution and a silicone, wherein the silicone is a silicon hydrolysate, D5, or D0. When the method of the invention is conducted with silicone hydrolysate, it eliminates the need to separate the silicone hydrolysate into its linear and cyclic constituents prior to redistribution.

17 Claims, No Drawings

POLYSILOXANE REDISTRIBUTION PROCESS

CROSS-REFERENCE TO RELATED APPLICATIONS

This application is a U.S. national stage filing under 35 U.S.C. §371 of PCT Application No. PCT/US09/50474 filed on Jul. 14, 2009, currently pending, which claims the benefit of U.S. Provisional Patent Application No. 61/092,081 filed Aug. 27, 2008 under 35 U.S.C. §119 (e). PCT Application No. PCT/US09/50474 and U.S. Provisional Patent Application No. 61/092,081 are hereby incorporated by reference.

BACKGROUND OF THE INVENTION

Commercial siloxane polymers are generally produced by the hydrolysis and condensation of hydrolyzable organosilicon compounds. The hydrolysis generates a mixture of linear and cyclic polysiloxanes. Depending upon demand, some polysiloxanes produced are more valuable than others. For example, cyclic polysiloxanes may be more valuable than the linear polysiloxanes. Thus, means of encouraging the production of cyclic over linear polysiloxanes in the hydrolysis and condensation of hydrolyzable organosilicon compounds process have been developed. Examples of such processes are described in U.S. Pat. No. 3,983,148, U.S. Pat. No. 4,423,240, U.S. Pat. No. 4,772,737, and U.S. Pat. No. 4,412,080. However, the influence that these processes have over the product is limited.

In addition to methods of influencing the products formed in the hydrolysis and condensation of hydrolysable organosilicon compounds, methods have also been reported to produce cyclic polysiloxanes from linear organopolysiloxanes. These processes include the acid- or base-catalyzed thermal cracking or depolymerization of diorganopolysiloxanes. However, these processes have associated issues such as high reaction temperatures, long reaction and/or equilibration times, high corrosiveness, and high polymer branching.

Processes have also been developed to redistribute cyclic polysiloxanes to produce different ring sizes. Examples of these processes are described in U.S. Pat. No. 4,556,726, U.S. Pat. No. 4,764,631, and EP 0 552 925. However these processes have associated issues such as requiring the separation of the cyclic polysiloxanes from the hydrolysis and condensation product prior to conducting the process, requiring high temperatures, poor control of the ring size polysiloxane produced, or low tolerance for variation in the starting polysiloxane composition. Thus, there exists a need for a process to redistribute polysiloxanes that addresses these issues. There exists a need for a process that does not require separation of the polysiloxane produced in the direct process prior to conducting the process and that can tolerate variation in the starting polysiloxane composition, that allows control of the ring size polysiloxane produced according to the process, and may be conducted at lower temperatures.

The present inventors have developed a method to redistribute cyclic and linear polysiloxanes. In particular, the inventors have found that specific ring-size cyclic and specific molecular weight linear polysiloxanes may be produced by contacting and heating i) a surfactant, ii) an aqueous hydrochloric acid solution, and iii) a silicone, wherein the silicone is silicone hydrolysate, $D_5$, or $D_6$.

BRIEF SUMMARY OF THE INVENTION

The invention involves redistributing polysiloxanes by a method comprising contacting and heating a surfactant, wherein the surfactant is the salt of a protonated amine or a quaternary amine compound, an aqueous hydrochloric acid solution and a silicone, wherein the silicone is a silicone hydrolysate, $D_5$, or $D_6$. When the method is conducted with silicone hydrolysate, it eliminates the need to separate the silicone hydrolysate into its linear and cyclic constituents prior to redistribution.

The nomenclature "$D_x$" as used herein is intended to mean a cyclic polysiloxane wherein each silicon in the cyclic polysiloxane ring is bonded to two oxygen atoms, and wherein "x" stands for the number of silicon atoms in the ring. "$D_x$" is intended to encompass cyclic polysiloxane structures wherein each silicon atom is bonded to two 1 to 5 carbon atom hydrocarbyl groups or one 1 to 5 carbon hydrocarbyl group and one hydrogen in addition to the two oxygen atoms. Examples of 1 to 5 carbon hydrocarbyl groups include methyl, ethyl, propyl, isopropyl, n-butyl, isobutyl, sec-butyl and pentyl. The following structures of hexamethylcyclotrisiloxane ($D_3$) and octamethylcyclotetrasiloxane ($D_4$) are provided as examples of this nomenclature:

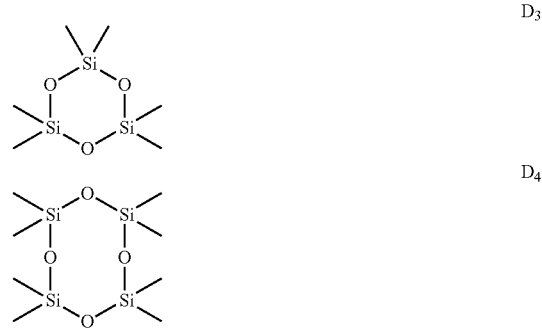

As used herein, "contacting", "contact", and "contacted" are intended to mean to bring together, which includes by forming in situ, in any order such that the materials referenced in relation therewith may touch and commingle.

DETAILED DESCRIPTION OF THE INVENTION

The present invention involves the contacting and heating of i) a surfactant, ii) an aqueous hydrochloric acid solution, and iii) a silicone, wherein the silicone is silicone hydrolysate, $D_5$, or $D_6$. When the process is carried out, the silicones are redistributed. The process may increase or decrease the quantity of $D_4$, $D_5$, or $D_6$ and increases the quantity of linear polysiloxane compared to the quantity of each before conducting the process.

The surfactant is a quaternary ammonium compound or a salt of a protonated amine, or mixtures thereof. When a salt of the protonated amine, the surfactant can be contacted directly with the hydrochloric acid and silicone. Alternatively, the salt of the protonated amine can be formed in situ by combining a suitable amine with an aqueous hydrochloric acid solution. Typically, the hydrogen chloride solution according to the invention is saturated; therefore, the amount of hydrogen chloride present is in excess to the amount required to form the salt of the protonated amine. When formed in situ, the mechanism of formation of the salt of a protonated amine can be represented by the standard acid-base reaction mechanism:

$$HA+B \rightarrow HB^+ + A^-$$

where B represents the amine, which is protonated to form HB$^+$; HA represents the acid which provides a hydrogen to B leaving A$^-$. HB$^+$ and A$^-$ collectively constitute the salt of the protonated amine according to the invention. Suitable amines to form the salt of a protonated amine in situ include primary, secondary and tertiary amines having at least one nitrogen-bonded alkyl group containing from 5 to 14 carbon atoms and can be represented by the formula NRR'R" wherein, in one embodiment, R is an alkyl group and, in another embodiment, an alkyl group having 5 to 14 carbon atoms, and each of R' and R" independently may be a hydrogen or an alkyl group having 1 to 4 carbon atoms. Suitable amines for use in forming the salt of a protonated amine surfactant include N-octylamine, 2-ethylhexylamine, N-pentylamine, N-hexylamine, N-cetyldimethylamine, N-dodecylamine, N-dodecyldipropylamine, N-octylmethylamine, N-nonylamine, N-tetradecylamine and the like. In one embodiment, the salt of a protonated amine surfactant is formed by adding N-octylamine to a hydrochloric acid solution where it is thereby protonated. One skilled in the art would know how to add a suitable amine to form the salt of the protonated amine in situ and would recognize that mixtures of suitable protonated amines could be contacted according to the invention as well.

When the surfactant is the salt of a protonated amine, the surfactant may also be contacted directly with the aqueous hydrochloric acid solution and the silicone. In one embodiment, the surfactant is a salt of a protonated amine and is contacted directly with the aqueous hydrochloric acid and the silicone. Suitable protonated amine salts which may be contacted directly as the surfactant with the aqueous hydrochloric acid solution include those having the formula RR'R"NH$^+$ X$^-$ wherein R, R' and R" are as defined above and X is fluoride, chloride, bromide, or iodide, or the anion of a strong mineral acid such as H$_2$SO$_4$ or H$_3$PO$_4$. In one embodiment, X is chloride. One skilled in the art would know how to contact the surfactant with the aqueous hydrochloric acid solution and the silicone.

The surfactant may be a quaternary ammonium compound. As used herein, "quaternary ammonium compound" is intended to mean a type of organic nitrogen compound in which the molecular structure includes a central nitrogen atom joined to four organic groups (the cation), and is meant to include quaternary ammonium salts in which the quaternary ammonium compound also includes a negatively charged acid radical (the anion). The structure of the quaternary ammonium salt follows:

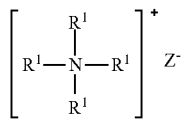

Wherein each R$^1$ is independently a 1-22C hydrocarbyl group and Z is the negatively charged acid radical (e.g., chloride). Examples of quaternary ammonium salts suitable for use according to the invention are 8-22C alkyl trimethyl ammonium halides, particularly chlorides, 8-22C alkyl dimethyl benzyl ammonium halides or di(8-22C alkyl) dimethyl ammonium halides where the 8-22C alkyl group is for example octyl, decyl, dodecyl, hexadecyl, oleyl or octadecyl or tallow or coco alkyl groups, as well as corresponding salts of these materials. Methosulphates, phosphates or acetates can be used as an alternative to halides in the examples above. When a quaternary amine is the surfactant, it is typically contacted directly with the hydrochloric acid and silicone according to the invention. One skilled in the art would know how to contact a quaternary ammonium salt with the hydrochloric acid and silicone according to the invention. Mixtures of protonated amines, protonated amine and quaternary ammonium salts, and quaternary ammonium salts may also be contacted as the surfactant.

The amount of surfactant contacted can range from 0.1 to 10 weight % based upon the total weight of i), ii), and iii); in another embodiment, the surfactant ranges from 0.5 to 5 weight % based upon the total weight of i), ii), and iii).

The concentration of hydrogen chloride in the aqueous hydrochloric acid solution can vary. In one embodiment, the aqueous hydrochloric acid solution is a saturated solution, and, therefore, the concentration of hydrogen chloride in the aqueous hydrochloric acid solution will vary depending upon the temperature and pressure of the aqueous hydrochloric acid solution. In another embodiment, the concentration of the hydrochloric acid solution is 95 to 100% of saturated solution concentration; in another embodiment, the concentration of the hydrochloric acid solution is from 98 to 100% of saturated solution concentration; in another embodiment, from 99 to 100%; and in yet another embodiment, essentially a saturated solution. The aqueous hydrogen chloride solution according to the invention is typically saturated with hydrogen chloride. One skilled in the art would understand how to make a saturated hydrochloric acid solution at varying temperatures. For example, a saturated solution of hydrogen chloride at 25° C. and a pressure of about 101 Kpa contains about 41 weight percent hydrogen chloride; at 40° C. and 101 Kpa, it contains about 39 weight percent hydrogen chloride.

The silicone which is contacted according to the invention may be silicone hydrolysate. The silicone hydrolysate comprises cyclic and linear polysiloxane. In one embodiment, the silicone hydrolysate comprises 20 to 80 weight % linear polysiloxane and 80 to 20 weight percent cyclic polysiloxane; in another embodiment, from 30 to 55 weight % linear polysiloxane and from 45 to 70 weight % cyclic polysiloxane; in another embodiment, 35 to 50 weight % linear polysiloxane and 65 to 50 weight % cyclic polysiloxane.

The cyclic polysiloxane in the silicone hydrolysate comprises D$_4$, D$_5$, D$_6$ or mixtures thereof. The amount of D$_4$, D$_5$ and D$_6$ within the cyclic polysiloxane can vary, but one of D$_4$, D$_5$, or D$_6$ is in excess compared to one of the other cyclic polysiloxane(s) in the silicone hydrolysate. As used herein, an "excess" is intended to mean that there is a greater weight % of one cyclic polysiloxane compared to another in the hydrolysate. The excess can be expressed by the difference between the weight % of the cyclic polysiloxane(s) in excess and the cyclic polysiloxane closest in weight % to the cyclic polysiloxane in excess in the silicone hydrolysate. In one embodiment, the excess is 5-100 weight %; in another embodiment, the excess is 10-80 weight %; in another embodiment, the excess is 10-60 weight %; in another embodiment, the excess is 10 to 50 weight %; in another embodiment, the excess is 15-45 weight %. In another embodiment, two of D$_4$, D$_5$, and D$_6$ are in excess compared to the other, and the excess is the difference in weight % between one of the two in excess and the cyclic polysiloxane not in excess. One skilled in the art would understand that the concentration of the cyclic polysiloxane in excess at the start of the process must be greater than its equilibrium concentration for the given reaction conditions and concentrations of the other cyclic polysiloxane(s); otherwise, significant redistribution will not take place. However, this distinction is usually insignificant, because the weight % excess of the one or two polysiloxanes at the start of the process is typically such that the equilibrium concentration is not approached, so the process will proceed, and the cyclic polysiloxanes will be redistributed.

In one embodiment, the cyclic polysiloxane in the silicone hydrolysate comprises 43-90 weight % $D_4$, 9-56 weight % $D_5$, and 1-23 weight % $D_6$ based upon the weight of the cyclic polysiloxane in the silicone hydrolysate; in another embodiment, the cyclic polysiloxane comprises 50-90 weight % $D_4$, 9-30 weight % $D_5$, and 1-20 weight % $D_6$; in another embodiment, the cyclic polysiloxane comprises 50-90 weight % $D_4$, 9-34 weight % $D_5$, and 1-16 weight % $D_6$. In one embodiment, the cyclic polysiloxane comprises cyclic polydimethylsiloxane. The silicone hydrolysate may also comprise 0.1 to 5 weight % cyclic polysiloxanes other than $D_4$, $D_5$, and $D_6$, and branched polysiloxane. The silicone hydrolysate may also comprise less than 3 weight % of starting materials and other by-products of the hydrolysis reaction conducted to create the silicone hydrolysate.

The silicone hydrolysate is formed by the hydrolysis and condensation of a halosilane or a mixture of halosilanes. Halosilanes used to form the silicone hydrolysate according to the invention may be created in what is known as the direct process. The direct process refers to the process in which silicon metal reacts with, for example, a haloalkane, such as chloromethane, in the presence of a catalyst. The direct process is well known in the art and is described in, for example, U.S. Pat. No. 2,905,703. The hydrolysis of halosilanes may be performed in a batch or continuous process. Typically, the hydrolysis is carried out in a continuous process where halosilanes are mixed with water and hydrogen halide in a suitable reactor to form the silicone hydrolysate. The resulting silicone hydrolysate and aqueous hydrogen halide may then be separated in a decanter or may be used directly in the process. Methods of hydrolyzing halosilanes are well known in the art.

In one embodiment, the silicone hydrolysate is formed from the hydrolysis of a halosilane comprising a chlorosilane of the formula $R^2{}_2SiCl_2$, wherein one of the $R^2$ groups of the chlorosilane is a hydrogen and the other is a 1-5C hydrocarbyl group, each $R^2$ is independently a 1-5C hydrocarbyl group, or mixtures thereof. The 1-5C hydrocarbyl group of the chlorosilane may be methyl, ethyl, propyl, isopropyl, n-butyl, isobutyl, tert-butyl, sec-butyl, pentyl. Examples of suitable chlorosilanes include compounds such as dimethyldichlorosilane, $(CH_3)_2SiCl_2$, diethyldichlorosilane, $(C_2H_5)_2SiCl_2$, di-n-propyldichlorosilane, $(n-C_3H_7)_2SiCl_2$, di-i-propyldichlorosilane, $(i-C_3H_7)_2SiCl_2$, di-n-butyldichlorosilane, $(n-C_4H_9)_2SiCl_2$, di-i-butyldichlorosilane, $(i-C_4H_9)_2SiCl_2$, di-t-butyldichlorosilane, $(t-C_4H_9)_2SiCl_2$, n-butylmethyldichlorosilane, $CH_3(n-C_4H_9)SiCl_2$, octadecylmethyldichlorosilane, $CH_3(C_{18}H_{37})SiCl_2$, diphenyldichlorosilane, $(C_6H_5)_2SiCl_2$, phenylmethyldichlorosilane, $CH_3(C_6H_5)SiCl_2$, dicyclohexyldichlorosilane, $(C_6H_{11})_2SiCl_2$, and methyldichlorosilane, $CH_3SiHCl_2$. Typical chlorosilanes forming the silicone hydrolysate according to the invention are dimethyldichlorosilane, $(CH_3)_2SiCl_2$, and methyldichlorosilane, $CH_3HSiCl_2$. If desired, monochlorosilanes, (i.e., $R^2{}_3SiCl$, where $R^2$ is the same as defined above) can be used to form the silicone hydrolysate. A preferred monochlorosilane, for example, is trimethylchlorosilane, $(CH_3)_3SiCl$. In one embodiment, the chlorosilane used to make the silicone hydrolysate is dimethyldichlorosilane.

The silicone hydrolysate comprises linear polysiloxane. The linear polysiloxane has a structure according to formula (I):

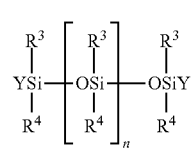

wherein each $R^3$ is independently a hydrogen or a 1-5C hydrocarbyl group, each $R^4$ is independently a 1-5C hydrocarbyl group, each Y is independently a halogen or hydroxyl group, and n is an integer $\geq 1$. In one embodiment, $R^3$ is hydrogen, each $R^4$ is independently a 1-5C hydrocarbyl group, Y is halogen or hydroxyl, and n is an integer $\geq 1$; in another embodiment, $R^3$ is hydrogen, each $R^4$ is independently methyl, ethyl, propyl, isopropyl, n-butyl, isobutyl, tert-butyl, sec-butyl, or pentyl, Y is chlorine, and n is an integer $\geq 1$; in another embodiment, $R^3$ is hydrogen, $R^4$ is methyl, Y is chlorine, and n is an integer $\geq 1$. In another embodiment, each $R^3$ and $R^4$ are independently 1-5C hydrocarbyl groups, Y is a halogen or hydroxyl group, and n is an integer $\geq 1$; In another embodiment, each $R^3$ and $R^4$ are independently methyl, ethyl, propyl, isopropyl, n-butyl, isobutyl, tert-butyl, sec-butyl, pentyl, Y is chlorine, and n is an integer $\geq 1$; in another embodiment, $R^3$ and $R^4$ are methyl, Y is chlorine, and n is an integer $\geq 1$.

The linear polysiloxane has hydroxyl, halogen, or a hydroxyl and halogen terminal group. The terminal group is represented by Y in formula (I). When Y is a halogen, the linear polysiloxane is halogen endblocked, and when Y is chlorine, the linear polysiloxane is chlorine endblocked. Additional, when Y is hydroxyl, the linear polysiloxane is hydroxyl endblocked. The terminal group, Y, can be the same or different on each linear polysiloxane chain or between linear polysiloxane polymer chains. Therefore, the percentage of linear polysiloxane terminal groups which are halogen or hydroxyl can vary. In one embodiment, the linear polysiloxane has 0 to 100% of the terminal groups halogen endblocked; in another embodiment, the from 0.01 to 100% are halogen endblocked; in another embodiment, from 0.1 to 100% are halogen endblocked; in another embodiment, from 50 to 100% are halogen endblocked; in another embodiment, from 95 to 100% are halogen endblocked; in another embodiment from 97 to 100% are halogen endblocked; in another embodiment, from 98 to 100% are halogen endblocked; in another embodiment, from 99 to 100% are halogen endblocked. In one embodiment, the halogen endblock of the linear polysiloxane is chlorine; in another embodiment, the linear polysiloxane is chlorine endblocked linear polydimethylsiloxane. One skilled in the art would understand the meaning of endblocking as herein described and would be able to determine the extent and identity of linear polysiloxane endblocking.

When the linear polysiloxane according to the invention is chlorine endblocked, by conducting the process with a saturated solution of hydrogen chloride, any chlorine from the linear polysiloxane can be recovered in the form of hydrogen chloride gas. By recovering the chlorine as hydrogen chloride gas, the process is more economical, because hydrogen chloride recovered in solution must be further processed to recover the hydrogen chloride gas or discarded.

The silicone contacted according to the invention may comprise $D_5$, $D_6$, or mixtures thereof. $D_5$ and $D_6$ are cyclic polysiloxanes according the following structure:

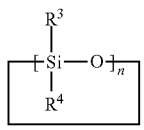

wherein n=5 for $D_5$ and n=6 for $D_6$, and $R^3$ and $R^4$ are as defined above. In one embodiment, the silicone comprises $D_5$ wherein $R^3$ is methyl or hydrogen and $R^4$ is methyl; in another embodiment, the silicone comprises $D_5$ wherein $R^3$ and $R^4$ are methyl; in another embodiment, the silicone comprises $D_6$ wherein $R^3$ is methyl or hydrogen and $R^4$ is methyl; in another embodiment, the silicone comprises $D_6$ wherein $R^3$ and $R^4$ are methyl; in another embodiment, the silicone comprises $D_5$ and $D_6$, and $R^3$ is a methyl group or hydrogen and $R^4$ is methyl; in another embodiment, the silicone comprises $D_5$ and $D_6$, wherein $R^3$ and $R^4$ are methyl groups. When the silicone comprises $D_5$, $D_6$, or mixtures thereof, the silicone may also comprise $D_4$ and/or 0 to <20 weight % linear and/or branched polysiloxane. $D_5$ and $D_6$ are made by, for example, the direct process and are separated from the silicone hydrolysate produced by, for example, fractional distillation. One skilled in the art would know how to contact $D_5$ and $D_6$ according to the invention. $D_5$ and $D_6$ are commercially available or may be made by the hydrolysis of a suitable halosilane and separation from the silicone hydrolysate produced by, for example, fractional distillation, as described above related to forming the silicone hydrolysate according to the invention.

When the silicone is silicone hydrolysate comprising halogen endblocked linear polysiloxane, some or all of the halogen endblocking groups are replaced with hydroxyl groups during the process. These hydroxyl groups may then undergo condensation with other linear polysiloxanes in the hydrolysate to increase the chain length of the linear polysiloxanes in the silicone hydrolysate. As a result of the replacement of the halogen endblocking group, the halogen can be recovered from the process. When the halogen endblocking group is chlorine, the chlorine may be recovered as hydrogen chloride gas and/or as aqueous hydrogen chloride. In one embodiment, chlorine is recovered from the process in the form of hydrogen chloride gas. In another embodiment, chlorine is recovered in the process as hydrogen chloride gas and as aqueous hydrogen chloride. In another embodiment, the chlorine is recovered as aqueous hydrogen chloride.

The molecular weight of the halogen endblocked linear polysiloxane in the silicone hydrolysate may vary. In one embodiment, the number average molecular weight (Mn) is <1500 atomic mass units (AMU); in another embodiment, from 100 to <1500 AMU. After conducting the process, the Mn of the linear polysiloxane is increased. The Mn of the linear polysiloxane produced by the process can vary. In one embodiment, the linear polysiloxane produced according to the invention has an Mn of 1500 AMU and above; in another embodiment, from 1500 to 4000 AMU; in another embodiment, from 1500 to 3800 AMU; in another embodiment, from 1500 to 3500 AMU; in another embodiment, from 2000 to 3000 AMU. One skilled in the art would know how to determine the MW of polysiloxanes according to the invention by, for example, gel permeation chromatography (GPC).

The mass ratio of silicone to aqueous hydrochloric acid solution can vary according to the process. In one embodiment, the ratio of silicone to aqueous hydrochloric acid is from 1:2 to 2:1; in another embodiment, from 1:1.5 to 1.5:1; in another embodiment, from 1:1.25 to 1.25:1; in another embodiment, the ratio of silicone to aqueous hydrochloric acid solution is essentially 1:1; in another embodiment, the ratio of silicone to aqueous hydrochloric acid solution is 1:1. The same ratio of hydrochloric acid to silicone is used whether or not the protonated amine is generated in situ. One skilled in the art would know how to vary the amount of silicone to aqueous hydrochloric acid to conduct the process.

During the process, the cyclic and linear polysiloxane are redistributed. As used herein, "redistribute" or "redistribution" is intended to mean to change the weight percentage of cyclic and linear polysiloxane by reducing the percentage of a cyclic polysiloxane of one ring size while increasing the weight percentage of a cyclic polysiloxane of another ring size and/or the linear polysiloxane in relation to the weight of the total polysiloxane, linear and cyclic. When conducted with silicone hydrolysate, the process typically results in the reduction of the weight percentage of the cyclic polysiloxane in excess compared to the other ring size cyclic polysiloxanes in the silicone hydrolysate at the start of the process. The weight percent of the cyclic polysiloxane in excess is reduced while the weight percentage of another cyclic polysiloxane not in excess is increased. For example, when the starting silicone hydrolysate is composed of an excess of $D_4$ compared to $D_5$ and $D_6$, the weight percent of $D_4$ is typically reduced and the weight percent of $D_5$, $D_6$, and linear polysiloxane are typically increased. Likewise, when starting with an excess of $D_5$, the $D_5$ is reduced, and the weight % of $D_4$, $D_6$ and linear polysiloxane are typically increased, and when starting with an excess of $D_6$, the $D_6$ is reduced, and the weight % of $D_5$ and $D_4$ and linear polysiloxane are typically increased.

When $D_5$ is the silicone contacted according to the invention, $D_4$, $D_6$, linear polysiloxane or blends thereof are produced, and the weight percent of $D_5$ is decreased. Likewise, when the silicone contacted is $D_6$, the $D_4$, $D_5$, linear polysiloxane, or blends thereof are produced. When a mixture of $D_5$ and $D_6$ are added, $D_4$ and linear polysiloxane are typically produced according to the process.

The cyclic and linear polysiloxane are redistributed according to the invention, and the change in weight % of the cyclic and linear polysiloxane from this redistribution may vary. In one embodiment, one ring size cyclic polysiloxane is reduced in weight % of the total polysiloxane by >15 weight % of the starting amount contacted; in another embodiment, the by >25 weight % of the starting amount contacted; in another embodiment, by greater than 40 weight % of the starting amount contacted; in another embodiment, the by 15 to 75 weight % of the starting amount contacted; in another embodiment, by from 25 to 70 weight % of the starting amount by from 40 to 65 weight % of the starting amount contacted. As the cyclic polysiloxane in excess is reduced in the process, the percentage of the other cyclic polysiloxane (i.e., $D_4$, $D_5$, or $D_6$), which were not in excess at the start of the process, and linear polysiloxanes are increased proportionally to the amount of reduction of the cyclic polysiloxane by the process. For example, a 10 weight % decrease in $D_4$, based on the total weight of $D_4$, $D_5$, $D_6$, and chlorine endblocked linear polydimethylsiloxane, is accompanied by a proportional increase in the weight % of $D_5$, $D_6$, and linear polydimethylsiloxane.

The temperature at which the process is conducted may vary. Typically, the temperature is at or over 60° C. In one embodiment, the temperature at which the hydrogen chloride aqueous solution, silicone, and surfactant are contacted according to the invention is from 60° C. to 180° C.; in another embodiment, from 70° C. to 150° C.; in another embodiment, from 70° C. to 120° C.; and in yet another embodiment, from 75° C. to 95° C. It would be understood by one skilled in the art that the silicone, the aqueous solution of hydrogen chloride, and the surfactant may be heated separately or together in varying combinations and that all heating methods known in the art are contemplated.

The pressure at which the aqueous hydrogen chloride solution, the silicone and the surfactant are contacted is not narrowly critical to the process. However, pressure indirectly impacts the reaction rate by influencing the amount of hydrogen chloride in the aqueous hydrochloric acid solution and the temperature at which the process may be conducted. In general, with increasing pressure more hydrogen chloride may dissolve in the aqueous hydrogen chloride solution and higher temperatures used. Thus, higher pressures allow more highly concentrated aqueous hydrochloric acid solutions and, therefore, faster reaction rates than lower pressures. Based on practical process considerations, the range of gauge pressure useable in the process of this invention extends from 0 Kilopascals to 1000 kiloPascals. In one embodiment, the pressure ranges from 10 kiloPascals to 500 kiloPascals; in another embodiment, the pressure ranges from 100 to 500 kiloPascals.

The time for which the silicone, the aqueous hydrogen chloride, and surfactant are contacted may vary according to the invention. In one embodiment, the contacting is for 1 to 60 minutes; in another embodiment, from 1 to 30 minutes; in another embodiment from 5 to 25 minutes; in another embodiment, from 5 to 15 minutes; in another embodiment, from 10 to 15 minutes. Typically, the contacting is for from 5 to 15 minutes. One skilled in the art would know how to monitor the process to determine when the desired amount of cyclic and/or linear polydimethylsiloxane has been produced according to the invention. One skilled in the art would also understand how the time should be varied with other process variable such as temperature and pressure.

When the silicone, aqueous hydrochloric acid solution, and surfactant are contacted according to the invention, they may be contacted with mixing. The mixing rate can vary according to the invention. Higher mixing rates and/or shear generally correlate with increased rate of reaction. One skilled in the art would know how to alter mixing rate and shear according to the invention.

A feature of the present invention is that it can be integrated with systems currently in use for hydrolyzing and condensing halosilanes to provide increased amounts of cyclic pentamer ($D_5$), hexamer ($D_6$) and linear polysiloxane. For example, a halosilane is contacted with an aqueous hydrochloric acid solution to produce silicone hydrolysates, which then are typically neutralized and/or water washed to provide a mixture of linear polysiloxanes and cyclic polysiloxanes. This mixture of linear and cyclic polysiloxanes are typically then separated by, for example, fractional distillation. With the present invention, instead of subjecting the silicone hydrolysate to the water washing and/or separation process as typical, the silicone hydrolysate may be treated directly pursuant to the process. That is, the silicone hydrolysate may be directly contacted with the surfactant and the aqueous hydrochloric acid solution. Hydrogen chloride gas may be recovered, and the resulting products may then be phase separated, and the phase containing the aqueous hydrochloric acid and the surfactant may be recycled for reuse in the same process. The phase containing the polysiloxanes may then be neutralized and washed with water and subjected to a separation step such as fractional distillation to separate into its constituent parts. If desired, the separated constituents, such as $D_4$, $D_5$, and $D_6$ may be fed back into the process by adding to the silicone hydrolysate prior to treatment according to the invention.

In addition to being able to be integrated within the current processes for the production polysiloxanes without subjecting the silicone hydrolysate to neutralization and washing steps prior to treatment to redistribute cyclic and linear polysiloxane, the process also allows for the recovery of some hydrogen chloride as a gas rather than in an aqueous solution. As discussed above, by contacting a saturated aqueous hydrogen chloride solution according to the invention, the chloride produced by the hydrolysis of chlorine endblocked linear polydimethylsiloxane may be recovered as a gas, because the hydrogen chloride thus produced cannot dissolve in the saturated solution. This avoids the need for disposal of hydrogen chloride solutions and eliminates energy intensive processes to recover hydrogen chloride from solution.

As discussed above, after the desired cyclic and linear polysiloxanes have been produced according to the invention, the reaction mixture is phase-separated into polysiloxane and aqueous phases. The polysiloxane phase is then neutralized in any suitable manner, such as by washing with water one or more times and/or by treatment with an alkaline reagent such as sodium bicarbonate or with a suitable ion exchange resin. After neutralization and washing, the polysiloxanes can be filtered to further remove foreign particulate material. After filtration, the product can then be fractionated if desired to separate the cyclic polymers from the linear polymers. The cyclic polymers can be fractionated by distillation, for example, to separate the cyclic pentamer ($D_5$) from the cyclic tetramer ($D_4$) and hexamer ($D_6$).

EXAMPLES

The following examples are included to demonstrate embodiments of the invention. It should be appreciated by those of skill in the art that the techniques disclosed in the examples which follow represent techniques discovered by the inventor to function well in the practice of the invention, and thus can be considered to constitute modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %.

The following is a list of abbreviations used in the examples:

LIST OF ABBREVIATIONS

RPM revolutions per minute
mL milliliter
HCl hydrochloric acid
Me methyl (i.e., the $CH_3$ radical)
CEB chlorine endblocked
D4 dimethylsiloxane cyclic tetramer, [$Me_2SiO$]$_4$
D5 dimethylsiloxane cyclic pentamer, [$Me_2SiO$]$_5$
D6 dimethylsiloxane cyclic hexamer, [$Me_2SiO$]$_6$
Lx linear polydimethylsiloxane: hydroxyl terminated, $HO[Me_2SiO]_xH$, and chlorine endblocked, $Cl[Me_2SiO]_{(x-1)}Si(CH_3)_2Cl$, where x is an integer >1.
CEB-Lx chlorine endblocked linear dimethylsiloxane, $Cl[Me_2SiO]_{(x-1)}Si(CH_3)_2Cl$, where x is an integer >1.
Mn number average molecular weight
Mw weight average molecular weight
PD polydispersity GPC testing for the examples was conducted using an Agilent 1100 series modular HPLC with the following specifications/parameters:

Detector module: Refractive index at 35° C.;
Column module: Set of 3 Polymer Laboratories PLgel 3 µM mixed-E columns at 40° C.;
Pump module: Isocratic pump with HPLC grade toluene mobile phase at 0.8 mL/minute;
Degassor module: vacuum degassing of toluene mobile phase
Autosampler module: 100 tray autosampler with 100 µL injection per sample
Data system: HP Chemstation analytical data system
Standards: Polymer Laboratories standards were used for linear regression calibrations

Example 1

295.3 g of 37% aqueous HCl were weighed and charged into 1,000 ml lab reactor. Demineralized water (85.4 g) was then added to the lab reactor to dilute the acid to 28.7% which is the saturated concentration at 95° C. Mixing was started, and 7.77 g of N-octylamine were added to the lab reactor. An aqueous solution which was 28.7% HCl and 2.0% N-octylamine was prepared in the lab reactor. The lab reactor was heated to 95° C. As soon as the temperature of the acid in the lab reactor reached 95° C., 388.5 g of silicone hydrolysate were fed to the lab reactor using a metering pump for about 2 min, agitating at 450 RPM. The silicone hydrolysate fed to the lab reactor contained 43.48% $D_4$, 11.41% $D_5$, 3.33% $D_6$ and 41.79% CEB-Lx. The temperature was slightly lowered during silicone hydrolysate feeding but promptly returned to 95° C. Samples were pulled from the lab reactor after 5, 10, 15, and 30 minutes from the commencement of the silicone hydrolysate feed to the reactor and allowed to phase separate. The upper layer siloxane phase was crystal clear, while the lower layer acid phase was slightly hazy. A sample of the upper layer siloxane phase was filtered through 2 µm Teflon filter for gel permeation chromatography (GPC) analysis. Table 1 lists these GPC analysis results.

TABLE 1

| Two weight % N-octylamine in acid phase at 95° C. | | | | | | | |
|---|---|---|---|---|---|---|---|
| Reaction time | Wt. % | Wt. % | Wt. % | Wt. % | Molecular Weight of Lx | | |
| (minutes) | D4 | D5 | D6 | Lx | Mn | Mw | PD |
| 0 | 43.48 | 11.41 | 3.33 | 41.79 | 1,265 | 1,599 | 1.26 |
| 5 | 41.09 | 13.47 | 3.36 | 42.08 | 1,970 | 3,379 | 1.72 |
| 10 | 38.44 | 14.95 | 3.71 | 42.89 | 2,351 | 4,942 | 2.10 |
| 15 | 36.61 | 16.27 | 3.92 | 43.20 | 2,650 | 5,505 | 2.08 |
| 30 | 32.19 | 18.86 | 4.63 | 44.32 | 3,121 | 6,762 | 2.17 |

This example demonstrates the process of the invention when the silicon is silicone hydrolysate and an excess of cyclic polysiloxane $D_4$ is used with 2 weight % N-octylamine at 95° C.

Example 2

The same experimental conditions and reactants were used as in Example 1, except the reaction temperature was lowered to 75° C., the N-octylamine concentration was increased to 4.0%, and the HCl concentration in the aqueous hydrochloric acid solution was also changed to 32.7%, which is saturated concentration at 75° C. The silicone hydrolysate fed to the lab reactor contained 43.05% $D_4$, 11.31% $D_5$, 3.19% $D_6$ and 42.46% CEB-Lx. Samples were taken from the lab reactor as in Example 1. After phase separation, the upper layer siloxane phase was sampled for GPC analysis. Table 2 provides the analysis results.

TABLE 2

| Four weight % N-octylamine in acid phase at 75° C. | | | | | | | |
|---|---|---|---|---|---|---|---|
| Reaction Time | Wt. % | Wt. % | Wt. % | Wt. % | Molecular Weight Lx | | |
| (minutes) | D4 | D5 | D6 | Lx | Mn | Mw | PD |
| 0 | 43.05 | 11.31 | 3.19 | 42.46 | 1,311 | 1,670 | 1.27 |
| 5 | 36.34 | 17.10 | 4.88 | 41.68 | 1,672 | 2,119 | 1.27 |
| 10 | 29.04 | 19.17 | 5.89 | 45.90 | 2,136 | 5,966 | 2.79 |
| 15 | 25.32 | 19.42 | 6.11 | 49.15 | 2,576 | 9,645 | 3.74 |
| 30 | 19.98 | 18.37 | 6.48 | 55.16 | 3,649 | 18,329 | 5.02 |

This example demonstrates the effects of doubling the N-octylamine concentration at the lower temperature of 74° C. compared to Example 1.

Example 3

The same experimental conditions and reactants as Example 2 were used except the N-octylamine concentration was increased to 6.0%. Table 3 provides the GPC analysis results of the resulting polysiloxanes.

TABLE 3

| Six weight % N-octylamine in acid phase at 75° C. | | | | | | | |
|---|---|---|---|---|---|---|---|
| Reaction time | Wt. % | Wt. % | Wt. % | Wt. % | Molecular Weight Lx | | |
| (minutes) | D4 | D5 | D6 | Lx | Mn | Mw | PD |
| 0 | 43.05 | 11.31 | 3.19 | 42.46 | 1,311 | 1,670 | 1.27 |
| 5 | 32.41 | 18.08 | 5.47 | 44.04 | 1,963 | 5,073 | 2.58 |
| 10 | 27.48 | 20.07 | 6.50 | 45.96 | 2,229 | 6,161 | 2.76 |
| 15 | 24.65 | 20.48 | 7.23 | 47.64 | 2,439 | 7,456 | 3.06 |
| 30 | 21.70 | 20.18 | 8.02 | 50.09 | 2,627 | 8,218 | 3.13 |

This example demonstrates the use of 6 weight % N-octylamine compared to 2 and 4 weight % in Examples 1 and 2 and the use of a reaction temperature of 75° C. versus 95° C. of example 1.

Example 4

The same experiment conditions and reactants were used as used in Example 3, except the reaction temperature was increased to 95° C., the HCl concentration in the aqueous phase was changed to 28.7%, and the silicone hydrolysate composition as in Example 2 was used. Table 4 lists the GPC analysis results for the resulting polysiloxane composition.

TABLE 4

| Six weight % N-octylamine in acid phase at 95° C. | | | | | | | |
|---|---|---|---|---|---|---|---|
| Reaction time | Wt. % | Wt. % | Wt. % | Wt. % | Molecular Weight Lx | | |
| (minutes) | D4 | D5 | D6 | Lx | Mn | Mw | PD |
| 0 | 43.05 | 11.31 | 3.19 | 42.46 | 1,311 | 1,670 | 1.27 |
| 5 | 31.60 | 19.45 | 5.84 | 43.12 | 1,982 | 3,292 | 1.66 |
| 10 | 26.17 | 21.27 | 7.19 | 45.38 | 2,102 | 3,710 | 1.77 |

TABLE 4-continued

Six weight % N-octylamine in acid phase at 95° C.

| Reaction time (minutes) | Wt. % D4 | Wt. % D5 | Wt. % D6 | Wt. % Lx | Molecular Weight Lx | | |
|---|---|---|---|---|---|---|---|
| | | | | | Mn | Mw | PD |
| 15 | 23.78 | 21.32 | 7.78 | 47.13 | 2,212 | 4,057 | 1.83 |
| 30 | 20.81 | 19.81 | 8.41 | 50.97 | 2,352 | 4,839 | 2.06 |

This example demonstrates the use of a 95° C. reaction temperature versus 75° C. with 6 weight % N-octylamine in Example 3.

Example 5

To simulate a production continuous process, experiments were conducted in a continuous stirred tank reactor in continuous mode. To make 28.7% aqueous HCl, 1,111 g of 37% aqueous HCl and 326 g of water were added to the lab reactor and the phase separator, and the agitator was started at 450 RPM. N-octylamine (86.3 g) was added to the lab reactor and the liquid reactants were circulated by pumps for 7 minutes to make a homogeneous solution. A pump transferred the reactants from the lab reactor to the lab separator, and another pump recycled acid from the bottom layer of the lab separator to the lab reactor. The speed of both pumps was adjusted to maintain the volume of both the reactor and the lab separator then stopped. Both the lab reactor and the lab separator were heated to 95° C. The silicone hydrolysate was fed to the lab reactor as soon as the lab reactor temperature reached 95° C. with no agitation. When the liquid level reached the full volume of the lab reactor, the agitator was started at 450 RPM, and the pumps were started at their set speed. Each pumps' speed was set to give a phase ratio of 1:1 aqueous HCl to silicone hydrolysate by volume and a reactor residence time of 10 minutes. The silicone hydrolysate fed to the lab reactor contained 44.22% $D_4$, 11.48% $D_5$, 3.20% $D_6$ and 41.10% CEB-Lx. The mixing speed and the reactor and the separator temperature were maintained at 450 RPM and 95° C. during the reaction. From the lab separator siloxane samples were taken after 5 minutes, 10 minutes, and 15 minutes residence time. The siloxane samples were filtered through a 2 μm Teflon filter for GPC analysis. Table 5 provides the analysis results.

TABLE 5

Six Percent N-octylamine in continuous process.

| Reactor Residence time (minutes) | Wt. % D4 | Wt. % D5 | Wt. % D6 | Wt. % Lx | Molecular Weight Lx | | |
|---|---|---|---|---|---|---|---|
| | | | | | Mn | Mw | PD |
| 0 | 44.22 | 11.48 | 3.20 | 41.10 | 1,381 | 1,850 | 1.34 |
| 5 | 33.47 | 18.48 | 5.51 | 42.55 | 2,450 | 5,942 | 2.43 |
| 10 | 28.14 | 19.05 | 6.45 | 46.36 | 2,601 | 8,654 | 3.33 |
| 15 | 25.07 | 19.03 | 7.05 | 48.85 | 2,627 | 9,532 | 3.63 |

This example is to demonstrate the use of the invention in a continuous process.

Example 6

The same reactants and reaction conditions were used in Example 6 as were used in Example 5 except the N-octylamine concentration was increased to 8.0% in the aqueous hydrochloric acid solution. Table 6 provides the GPC analysis results for the polysiloxane product.

TABLE 6

Eight % N-octylamine in continuous process.

| Reactor Residence time (minutes) | Wt. % D4 | Wt. % D5 | Wt. % D6 | Wt. % Lx | Molecular Weight Lx | | |
|---|---|---|---|---|---|---|---|
| | | | | | Mn | Mw | PD |
| 0 | 44.22 | 11.48 | 3.20 | 41.10 | 1,381 | 1,850 | 1.34 |
| 5 | 31.98 | 18.99 | 5.75 | 43.28 | 2,272 | 5,054 | 2.22 |
| 10 | 27.29 | 18.91 | 6.54 | 47.26 | 2,482 | 8,430 | 3.40 |
| 15 | 25.81 | 18.90 | 6.74 | 48.55 | 2,416 | 9,308 | 3.85 |

This example demonstrates the invention in a continuous process and with 8 weight % N-octylamine.

Example 7

The same experimental conditions and reactants were used as in Example 5 except the N-octylamine concentration in the aqueous hydrochloric acid solution was 5.0%. The silicone hydrolysate fed to the lab reactor contained 43.78% $D_4$, 11.48% $D_5$, 2.79% $D_6$ and 41.94% CEB-Lx. Table 7 provides the GPC analysis results of the product polysiloxane.

TABLE 7

Five % N-octylamine in continuous process.

| Reactor Residence time (minutes) | Wt. % D4 | Wt. % D5 | Wt. % D6 | Wt. % Lx | Molecular Weight Lx | | |
|---|---|---|---|---|---|---|---|
| | | | | | Mn | Mw | PD |
| 0 | 43.78 | 11.48 | 2.79 | 41.94 | 1,448 | 2,048 | 1.41 |
| 5 | 32.32 | 17.80 | 5.16 | 44.73 | 2,226 | 6,108 | 2.74 |
| 10 | 29.38 | 18.76 | 5.97 | 45.89 | 2,450 | 6,941 | 2.83 |
| 15 | 25.66 | 18.81 | 6.78 | 48.76 | 2,529 | 7,244 | 2.86 |

This example demonstrates the invention in a continuous process and with 5 weight % N-octylamine.

Example 8

Comparative

The same experiment as Example 1 was repeated, but no N-octylamine was added, and the weight % of cyclic polydimethylsiloxane in the silicone hydrolysate fed to the lab reactor was 5.38% D4, 4.79% D5, and 3.52% D6, while the weight % of linear polydimethylsiloxane was 86.31% CEB-Lx. Samples were taken as in Example 1. The run was stopped after 10 minutes due to difficulty in sampling and to avoid gelling of the reaction mixture from the rapid increase of the molecular weight of the linear polydimethylsiloxane and resulting increase in viscosity. Table 8 provides the GPC analysis results.

TABLE 8

Primarily linear polydimethylsiloxane and no N-octylamine.

| Reaction time (minutes) | Wt. % D4 | Wt. % D5 | Wt. % D6 | Wt. % Lx | Molecular Weight Lx (Mn) |
|---|---|---|---|---|---|
| 0 | 5.38 | 4.79 | 3.52 | 86.31 | 1,643 |
| 5 | 6.34 | 3.94 | 1.45 | 88.27 | 3,980 |
| 10 | 6.27 | 4.09 | 1.46 | 88.18 | 6.752 |

This example compares the results when no N-octylamine is used and weight % linears outside the scope of the invention.

Example 9

Comparative

Example 8 was repeated, but N-octylamine was added to 2.0 weight % in the hydrochloric acid. The weight % cyclic polydimethylsiloxane in silicone hydrolysate was 5.38% D4, 4.79% D5, and 3.52% D6, while the linear polydimethylsiloxane (CEB-Lx) was 86.31 weight %. Samples were taken as in Example 8, but the experiment was stopped after 5 minutes because the reaction started to gel (i.e., increase in viscosity to the point that the reaction mixture could not be stirred or sampled). Comparing with Example 1, the results in Table 8 and Table 9 indicate that when the process is run with amounts of CEB-Lx outside of the ranges of the invention, the polymerization proceeds too quickly and the molecular weight of the CEB-Lx increases too quickly and too much. Table 9 provides the GPC analysis results.

TABLE 9

Primarily linear polydimethylsiloxane and N-octylamine (2.0 weight %).

| Reaction time (minutes) | Wt. % D4 | Wt. % D5 | Wt. % D6 | Wt. % Lx | Molecular Weight Lx (Mn) |
|---|---|---|---|---|---|
| 0 min | 5.38 | 4.79 | 3.52 | 86.31 | 1,643 |
| 5 min | 7.36 | 3.97 | 1.53 | 87.13 | 3,874 |

This example compares the use of hydrolysate with a linear polysiloxane concentration outside the present invention.

Example 10

Comparative

To make a 28.7% aqueous HCl solution, 946.3 g of 37% aqueous HCl and 281.3 g of water were added to the reactor and the phase separator of a continuous stirred tank reactor and agitated at 300 RPM. N-octylamine (129.2 g) was added to the lab reactor and the liquid circulated through pumps to make homogeneous solution. The pumps were stopped after the speed was adjusted for the reaction. Both of the lab reactor and the lab separator were heated to and held at 95° C. $D_4$ was then fed into the lab reactor with no agitation. When full, the lab reactor was agitated at 300 RPM, and the pumps were started to circulate the reactants. The upper layer siloxane phase was crystal clear while the lower layer acid phase was hazy in lab separator. Siloxane samples were taken at 3 min, 7 min, and 15 min residence time and filtered through 2 μm Teflon filter for GPC analysis. Table 10 provides the analysis results.

TABLE 10

$D_4$ and N-Octylamine (10 weight % in acid phase).

| Reactor Residence time (minutes) | Wt. % $D_4$ | Wt. % $D_5$ | Wt. % $D_6$ | Wt. % Lx | Molecular Weight | | |
|---|---|---|---|---|---|---|---|
| | | | | | Mn | Mw | PD |
| 0 | 100.0 | 0.0 | 0.0 | 0.0 | — | — | — |
| 3 | 67.4 | 18.4 | 4.7 | 9.5 | 1,332 | 1,947 | 1.46 |
| 7 | 60.2 | 21.1 | 5.5 | 13.3 | 1,366 | 2,231 | 1.63 |
| 15 | 56.1 | 22.8 | 6.1 | 15.0 | 1,338 | 1,919 | 1.43 |

This example compares the use of a silicone which is outside the concentration of the present invention. The example uses 100 weight % $D_4$, which is considered outside the scope of the present invention.

Example 11

Example 5 was repeated except the reaction temperature was varied from 25° C. to 95° C. No N-octylamine was added until the temperature was increased to 95° C. when 5.5 weight % N-octylamine based on the acid phase was added. The hydrochloric acid solution was saturated at all temperatures. A reactor residence time of 10 min was kept at each temperature. The silicone hydrolysate fed to the lab reactor contained 49.59% $D_4$, 12.86% $D_5$, 3.51% $D_6$ and 34.03% CEB-Lx. Siloxane samples were taken and analyzed by GPC. Table 11 provides the analysis results. As the reaction took place at saturated aqueous HCl, the chlorine released from CEB-Lx was vaporized to gaseous phase where it could be recovered. (The % CEB values are normalized data from gas chromatography (GC) analysis, assuming all Lx in feed is CEB-Lx.)

TABLE 11

Chlorine of CEB-Lx reduction and conversion variation with temperature and N-octylamine.

| Reaction Temp (° C.) | N-octylamine in Acid (weight %) | Weight % | | | | | Molecular Weight Lx | | |
|---|---|---|---|---|---|---|---|---|---|
| | | $D_4$ | $D_5$ | $D_6$ | Lx | CEB-Lx | Mn | Mw | PD |
| 25 | 0 | 49.09 | 12.88 | 3.11 | 34.92 | 28.95 | 1,258 | 1,725 | 1.37 |
| 75 | 0 | 48.43 | 12.60 | 2.58 | 36.39 | 17.77 | 1,720 | 2,626 | 1.53 |
| 95 | 0 | 47.69 | 12.74 | 2.35 | 37.22 | 0.80 | 2,488 | 3,966 | 1.59 |
| 95 | 5.5 | 35.55 | 20.63 | 5.80 | 38.02 | 0.90 | 2,048 | 6,846 | 3.28 |

This invention is to demonstrate the change in concentration of CEB-Lx during the process of the invention.

Example 12

284.8 g of 37% aqueous HCl were added to a 1,000 mL lab reactor. Demineralized water (82.4 g) was added to dilute the acid to 28.7%. Mixing at 450 RPM was started, and 21.37 g of N-octylamine added. The lab reactor was heated to 95° C., and 388.5 g of a mixture of $D_5$ and $D_6$ (97.16% $D_5$ and 2.84% $D_6$) was fed to the lab reactor. The temperature was maintained at 95° C. after addition of the D5/D6 mixture, and samples were taken after 5, 10, 15, and 30 minutes from the start of the D5/D6 addition. A sample of the upper layer siloxane phase was filtered through 2 μm Teflon filter and analyzed by gel permeation chromatography (GPC) analysis. Table 12 lists these GPC analysis results.

TABLE 12

Five weight % N-octylamine in acid phase at 95° C.

| Reaction time | Wt. % | Wt. % | Wt. % | Wt. % | Molecular Weight of Lx | | |
|---|---|---|---|---|---|---|---|
| (minutes) | D4 | D5 | D6 | Lx | Mn | Mw | PD |
| 0 | 0.00 | 97.16 | 2.84 | 0.00 | 833 | 948 | 1.14 |
| 5 | 14.59 | 75.60 | 5.24 | 4.57 | 833 | 948 | 1.14 |
| 10 | 24.42 | 65.53 | 7.18 | 2.87 | 879 | 2,012 | 2.29 |
| 15 | 28.88 | 55.37 | 8.45 | 7.29 | 1,060 | 3,486 | 3.29 |
| 30 | 34.29 | 42.14 | 12.08 | 11.50 | 1,041 | 1,344 | 1.29 |

Example 13

The same experimental conditions were used as in Example 12, except the ratio of cyclic polysiloxanes noted in table 13 was added to the lab reactor in place of the mixture of Example 12. Samples were taken from the lab reactor as in Example 12 and analyzed by GPC. Table 13 provides the analysis results.

TABLE 13

Five weight % N-octylamine in acid phase at 95° C.

| Reaction time | Wt. % | Wt. % | Wt. % | Wt. % | Molecular Weight of Lx | | |
|---|---|---|---|---|---|---|---|
| (minutes) | D4 | D5 | D6 | Lx | Mn | Mw | PD |
| 0 | 0.36 | 2.48 | 97.07 | 0.09 | 1,860 | 3,944 | 2.12 |
| 5 | 7.69 | 8.53 | 71.02 | 12.76 | 1,860 | 3,944 | 2.12 |
| 10 | 13.37 | 13.73 | 68.32 | 4.58 | 1,054 | 1,870 | 1.77 |
| 15 | 16.94 | 17.16 | 60.69 | 5.22 | 1,470 | 7,244 | 4.93 |
| 30 | 21.28 | 20.88 | 35.71 | 22.13 | 1,328 | 4,640 | 3.49 |

Example 14

The same experimental conditions were used as in Example 12, except hydrolysate with the percentage of cyclic and linear species given in Table 14 (41.00% $D_4$, 21.34% $D_5$, 3.60% $D_6$ and 34.06% CEB-Lx) was fed into the reactor in place of the mixture of Example 12. Samples were taken from the lab reactor as in Example 12 and analyzed by GPC analysis. Table 14 provides the analysis results.

TABLE 14

Five weight % N-octylamine in acid phase at 95° C.

| Reaction time | Wt. % | Wt. % | Wt. % | Wt. % | Molecular Weight of Lx | | |
|---|---|---|---|---|---|---|---|
| (minutes) | D4 | D5 | D6 | Lx | Mn | Mw | PD |
| 0 | 41.00 | 21.34 | 3.60 | 34.06 | 1,178 | 1,752 | 1.49 |
| 5 | 33.46 | 25.65 | 6.14 | 34.75 | 1,857 | 4,830 | 2.60 |
| 10 | 28.93 | 26.05 | 7.73 | 37.29 | 1,991 | 5,071 | 2.55 |
| 15 | 26.81 | 25.48 | 8.71 | 39.01 | 2,026 | 5,219 | 2.58 |
| 30 | 22.58 | 22.04 | 9.64 | 45.74 | 2,140 | 5,709 | 2.67 |

Example 15

The same experimental conditions were used as in Example 12, except that silicone hydrolysate with the percentage of cyclic and linear species listed in table 15 was fed into the reactor in place of the silicone hydrolysate of Example 12. Samples were taken from the lab reactor as in Example 12 and analyzed by GPC. Table 15 provides the analysis results.

TABLE 15

Five weight % N-octylamine in acid phase at 95° C.

| Reaction time | Wt. % | Wt. % | Wt. % | Wt. % | Molecular Weight of Lx | | |
|---|---|---|---|---|---|---|---|
| (minutes) | D4 | D5 | D6 | Lx | Mn | Mw | PD |
| 0 | 44.47 | 11.64 | 6.96 | 36.93 | 1,178 | 1,752 | 1.49 |
| 5 | 34.19 | 19.76 | 9.26 | 36.79 | 1,890 | 3,082 | 1.63 |
| 10 | 29.69 | 22.19 | 9.59 | 38.52 | 2,013 | 3,505 | 1.74 |
| 15 | 26.20 | 23.01 | 9.97 | 40.81 | 2,039 | 3,664 | 1.80 |
| 30 | 22.38 | 21.60 | 9.98 | 46.03 | 2,184 | 4,622 | 2.12 |

That which is claimed is:

1. A process to redistribute cyclic and linear polysiloxanes, comprising:
    contacting and heating a surfactant, wherein the surfactant is a salt of a protonated amine or a quaternary ammonium compound,
    an aqueous hydrochloric acid solution, and
    a silicone comprising a silicone hydrolysate,
        wherein the silicone hydrolysate comprises from 20 to 80 weight %, based upon the weight of the silicone, linear polysiloxane, and
        wherein the silicone hydrolyzate comprises a cyclic polysiloxane, and
        wherein the linear polysiloxane is chlorine endblocked linear polydimethylsiloxane, and
        wherein the silicone hydrolysate comprises:
            from 31 to 47 weight percent $D_4$;
            from 8 to 30 weight % $D_5$;
            from 1 to 12 weight % $D_6$; and
            from 38 to 45 weight % chlorine endblocked linear polydimethylsiloxane.
2. The process of claim 1 wherein the surfactant is a salt of a protonated amine and is formed from an amine according to formula (I):

$$NRR'R'' \qquad (I)$$

wherein R is an alkyl group, and R' and R" may independently be a hydrogen atom or an alkyl group having 1 to 4 carbon atoms.

3. The process of claim 2 wherein R is an alkyl group having 5 to 14 carbon atoms and each
R' and R" is independently a hydrogen atom or an alkyl group having 1 to 4 carbon atoms.

4. The process of claim 3 wherein the surfactant is formed from N-octylamine.

5. The process of claim 1 wherein the heating is at a temperature from 60° C. to 180° C.

6. The process of claim 1 wherein the aqueous hydrochloric acid solution is a saturated solution.

7. The process of claim 6 wherein the aqueous hydrochloric acid solution and the silicone are contacted in a ratio from 1:2 to 2:1.

8. The process of claim 1 wherein the surfactant concentration is from 0.1 wt. % to 10 weight % based upon the weight of the aqueous hydrochloric acid solution, the surfactant, and the silicone.

9. The process of claim 1 wherein the process is conducted at a pressure from 0 to 1000 kiloPascals.

10. The process of claim 1 wherein the contacting and heating step is conducted for 1 minute to 60 minutes.

11. The process of claim 1 wherein the silicone is redistributed and wherein after the process is conducted the distribution of cyclic polysiloxane is different than the distribution in the silicone contacted.

12. A process to redistribute cyclic and linear polysiloxanes, comprising:
contacting and heating a surfactant, wherein the surfactant is a salt of a protonated amine or a quaternary ammonium compound,
an aqueous hydrochloric acid solution, and
a silicone comprising silicone hydrolysate, wherein the silicone hydrolysate comprises from 20 to 80 weight %, based upon the weight of the silicone, linear polysiloxane, and
recovering hydrogen chloride as a gas.

13. The process of claim 12, wherein the surfactant is N-octylamine hydrochloride,
the aqueous hydrochloric acid solution is a saturated aqueous hydrochloric acid solution, and the contacting is at a temperature from 60° C. to 180° C., at a pressure from 0 to 1000 kiloPascals, and for a time from 1 to 60 minutes.

14. A process to redistribute cyclic and linear polysiloxanes, comprising:
(1) contacting and heating
a surfactant, wherein the surfactant is a salt of a protonated amine or a quaternary ammonium compound,
an aqueous hydrochloric acid solution, and
a silicone comprising from 0 to <20 weight % linear polysiloxane based upon the weight of the silicone; and wherein the silicone comprises an excess of $D_5$, or an excess of $D_6$; and
(2) recovering hydrogen chloride as a gas.

15. The process of claim 14 wherein the silicone comprises an excess of $D_5$.

16. The process of claim 14 wherein the silicone comprises an excess of $D_6$.

17. The process of claim 14, wherein
the surfactant is N-octylamine hydrochloride,
the aqueous hydrochloric acid solution is a saturated aqueous hydrochloric acid solution, and
the contacting is at a temperature from 60° C. to 180° C., at a pressure from 0 to 1000 kiloPascals, and for a time from 1 to 60 minutes.

* * * * *